(12) United States Patent
Khuong et al.

(10) Patent No.: US 11,008,109 B2
(45) Date of Patent: May 18, 2021

(54) AIRCRAFT ICE PROTECTION SYSTEMS

(71) Applicant: The Boeing Company, Chicago, IL (US)

(72) Inventors: Kenny Tu Khuong, Summerville, SC (US); Michael James Basala, Summerville, SC (US)

(73) Assignee: The Boeing Company, Chicago, IL (US)

( * ) Notice: Subject to any disclaimer, the term of this patent is extended or adjusted under 35 U.S.C. 154(b) by 361 days.

(21) Appl. No.: 16/036,905

(22) Filed: Jul. 16, 2018

(65) Prior Publication Data
US 2020/0017222 A1 Jan. 16, 2020

(51) Int. Cl.
*B64D 15/12* (2006.01)
*B64D 15/20* (2006.01)
*H05B 3/26* (2006.01)

(52) U.S. Cl.
CPC ............. *B64D 15/12* (2013.01); *B64D 15/20* (2013.01); *H05B 3/265* (2013.01); *H05B 2214/02* (2013.01)

(58) Field of Classification Search
CPC .............................. B64D 15/12; B64D 15/20; B64D 2033/0233; B64C 1/067; H05B 3/265; H05B 2214/02
See application file for complete search history.

(56) References Cited

U.S. PATENT DOCUMENTS

| | | | |
|---|---|---|---|
| 2,447,095 A | 8/1948 | Schmidt | |
| 2,470,128 A | 5/1949 | Barrick et al. | |
| 2,478,878 A | 8/1949 | Smith et al. | |
| 2,556,736 A | 6/1951 | Palmatier | |
| 2,581,760 A | 1/1952 | Harpoothian et al. | |
| 2,638,170 A | 5/1953 | Prewitt | |
| 2,723,092 A | 11/1955 | Paselk et al. | |
| 3,023,860 A | 3/1962 | Ellzey | |
| 6,027,075 A | 2/2000 | Petrenko | |
| 6,114,050 A | 9/2000 | Westre et al. | |
| 7,763,833 B2 | 7/2010 | Hindel et al. | |

(Continued)

FOREIGN PATENT DOCUMENTS

| | | |
|---|---|---|
| EP | 3501989 A1 | 6/2019 |
| GB | 787581 A | 12/1957 |

OTHER PUBLICATIONS

Zhou, Jicheng et al., "Surface and Electrical Properties of NiCr Thin Films Prepared by DC Magnetron Sputtering", Journal of Wuhan University of Technology, Material Science Edition, vol. 23, No. 2, Apr. 1, 2008, pp. 159-162.

(Continued)

*Primary Examiner* — Rodney A Bonnette
(74) *Attorney, Agent, or Firm* — Kolisch Hartwell, P.C.

(57) ABSTRACT

Ice protection systems for aircraft, and methods of their manufacture, where the ice protection system includes a metallic substance applied to a nonconductive substructure of the external skin portion at a leading edge of an aircraft, an electrical power source, and a conductor circuit electrically connecting the power source across the metallic substance. In particular, the metallic substance may be applied to a nonconductive substructure on an annular inlet surface of an aircraft nacelle lip skin, and a power source can be electrically connected across the metallic substance.

20 Claims, 4 Drawing Sheets

(56) References Cited

U.S. PATENT DOCUMENTS

| | | | |
|---|---|---|---|
| 9,193,466 | B2 | 11/2015 | Calder et al. |
| 9,253,823 | B2 | 2/2016 | Nordman et al. |
| 9,463,879 | B2 | 10/2016 | Khozikov et al. |
| 9,511,871 | B2 | 12/2016 | Steinwandel et al. |
| 2005/0006529 | A1* | 1/2005 | Moe ................ B64D 15/12 244/134 D |
| 2005/0213278 | A1 | 9/2005 | Hawley |
| 2008/0149619 | A1 | 6/2008 | Vontell |
| 2011/0024568 | A1 | 2/2011 | Bardwell |
| 2011/0244150 | A1 | 10/2011 | Thrash et al. |
| 2013/0082143 | A1 | 4/2013 | Storozuk |
| 2014/0070054 | A1* | 3/2014 | Burton ............ H01L 51/0048 244/134 D |
| 2014/0191084 | A1 | 7/2014 | Gambino et al. |
| 2015/0241147 | A1 | 8/2015 | Brooks et al. |
| 2016/0114883 | A1 | 4/2016 | Guerry et al. |
| 2016/0305321 | A1* | 10/2016 | Pujar ................ B64D 15/12 |
| 2018/0124874 | A1 | 5/2018 | Dardona et al. |

OTHER PUBLICATIONS

European Patent Office, Extended European Search Report regarding European Patent Application No. 19185618.6, dated Oct. 16, 2019, 14 pages.

European Patent Office, Examination Report regarding European Patent Application No. 19185618.6, dated Oct. 21, 2020, 7 pages.

* cited by examiner

AIRCRAFT ICE PROTECTION SYSTEMS

FIELD

This disclosure relates to ice protection systems for aircraft external surfaces, and methods for their manufacture. More specifically, the disclosed examples relate to thermal electric ice protection systems for aircraft.

INTRODUCTION

Aircraft that encounter cold and moist air may be susceptible to the formation of ice on various surfaces of the aircraft. Under these conditions ice accumulation on wings, engine nacelles, turbine elements, or other surfaces may compromise the flight characteristics of the aircraft. Those components most susceptible to icing may be fitted with anti-icing equipment and systems as appropriate for the particular aircraft. A variety of different mechanical, chemical, and thermal systems have been developed and used for preventing or removing ice buildup on aircraft surfaces.

Some thermal anti-icing systems in current use redirect heated air from the aircraft's engines to areas where icing may occur. Unfortunately, such systems may require a complex array of mechanical components, including valves, sensors, hot air distribution ducts, insulation, support structure, mounting components, and fasteners. These systems therefore significantly increase engineering and manufacturing costs, as well as operational and maintenance costs. In addition, such mechanical systems may impose a performance penalty, i.e., increase in fuel consumption, by increasing weight and diverting fan air for anti-ice operation. In addition, the necessity of heating the outer skin of the aircraft from the inside requires the skin in such areas to be fabricated from high temperature tolerant material such as metal, preventing the use of lighter materials that are less capable of resisting such intense heating.

Alternatively, thermal anti-icing systems may employ resistive heating, where heat is generated at a desired location by the application of a current through a sufficiently resistive material. Unfortunately, the amount of current required for efficient heating necessitates the addition of generators and/or battery banks, and the increased weight penalties of such systems has made them impractical for commercial use.

What is needed are anti-icing systems that rapidly and efficiently remove and/or prevent icing on aircraft without the complexity, weight penalties, and excessive electrical demands of previous systems, making their use in commercial aircraft economical and advantageous.

SUMMARY

The present disclosure provides ice protection systems for aircraft, and their manufacture.

In some examples, the disclosure may provide an ice protection system for an aircraft engine, where the aircraft engine nacelle includes an inner barrel portion connected to a lip skin portion, which in turn may include an annular inlet surface on a nonconductive substructure. The ice protection system may include a metallic substance disposed on at least a portion of the annular inlet surface of an aircraft nacelle, an electrical power source, and a conductor circuit electrically connecting the power source across the metallic substance.

In some examples, the disclosure may provide an ice protection system for an aircraft, the aircraft having an external skin portion, and the external skin portion having a leading edge surface on a nonconductive substructure. The ice protection system may include a metallic substance disposed on the leading edge surface, an electrical power source, and a conductor circuit electrically connecting the power source across the metallic substance.

In some examples, the disclosure may provide a method of manufacturing an ice protection system for an aircraft, where the method may include applying a metallic substance to a nonconductive substructure on an annular inlet surface of an aircraft nacelle lip skin, and electrically connecting a power source across the metallic substance.

The disclosed features, functions, and advantages of the disclosed systems and methods may be achieved independently in various examples of the present disclosure, or may be combined in yet other examples, further details of which can be seen with reference to the following description and drawings.

DESCRIPTION

The ice protection systems of the present disclosure include a metallic substance disposed on a nonconductive substrate. The metallic substance may be applied as a thin layer, and by selecting an appropriate thickness, geometry, and composition of the metallic layer the application of a current across the layer may create resistive heating within the metallic layer. In one aspect the resistive heating may be great enough to melt ice that may be present on the metallic layer, and/or prevent ice from forming on the metallic layer.

In particular, the ice protection system may include a metallic substance that may be applied to or deposited on a nonconductive substructure of an aircraft, particularly a substructure disposed on a leading edge surface of an aircraft component, an appropriate electrical power source, and an appropriate circuit that connects the power source across the metallic substance to generate resistive heating thereby.

It should be appreciated that the ice protection systems disclosed herein may be used advantageously for the prevention of ice accumulation and/or for ice removal on any suitable surface, structure, building, or vehicle, without limitation. The disclosed ice protection systems may prove useful in arctic environments, for example, or at mountain elevations where ice build-up may be problematic. However, the disclosed ice protection systems possess particular advantages when applied to aircraft, and when employed in the context of aircraft and aeronautics.

Figure 1:
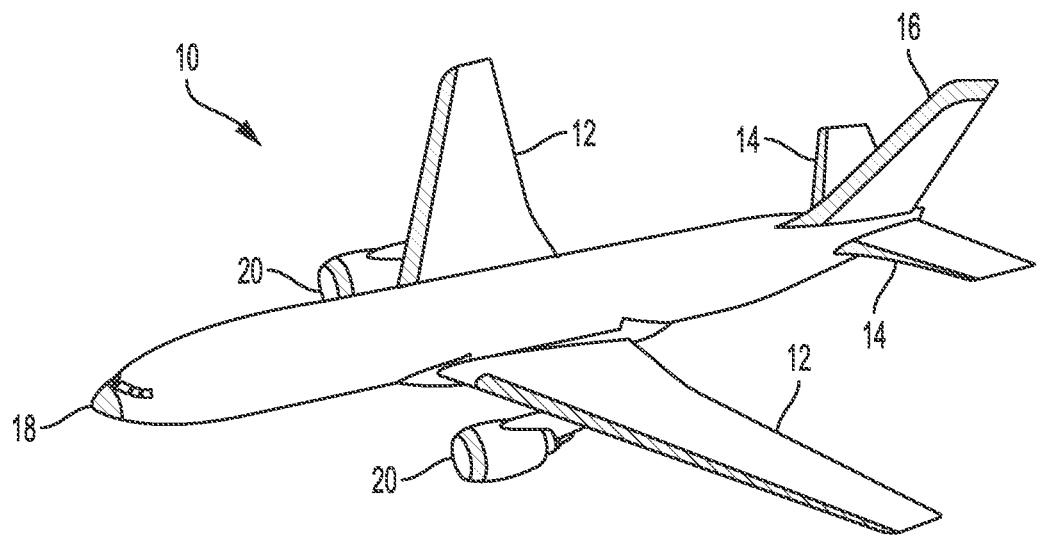
FIG. 1 depicts an illustrative aircraft indicating potential locations for installation of ice protection systems according to the present disclosure.

An illustrative aircraft 10 is shown in FIG. 1, where shading is used to nonexclusively indicate areas where the application of an ice protection system according to the present disclosure may be beneficial. For example, during flight under icing conditions ice may accumulate on or near a leading edge of a number of aircraft components, particularly the leading edges of aerodynamic surfaces such as wings 12, horizontal stabilizers 14, or vertical stabilizer 16. Other leading edges that may be susceptible to icing may include the nose of the aircraft 18, and/or an engine nacelle 20, among others. While the leading edges of these aircraft components may be typical (i.e. conventional) locations for ice protection systems, it should be appreciated that the ice protection systems of the present disclosure may also be used, or configured for use, on or adjacent to a variety of other aircraft structures and surfaces, if desired, such as canards, winglets, strakes, pitot tubes, antennae, or landing gear, among others.

Figure 2:
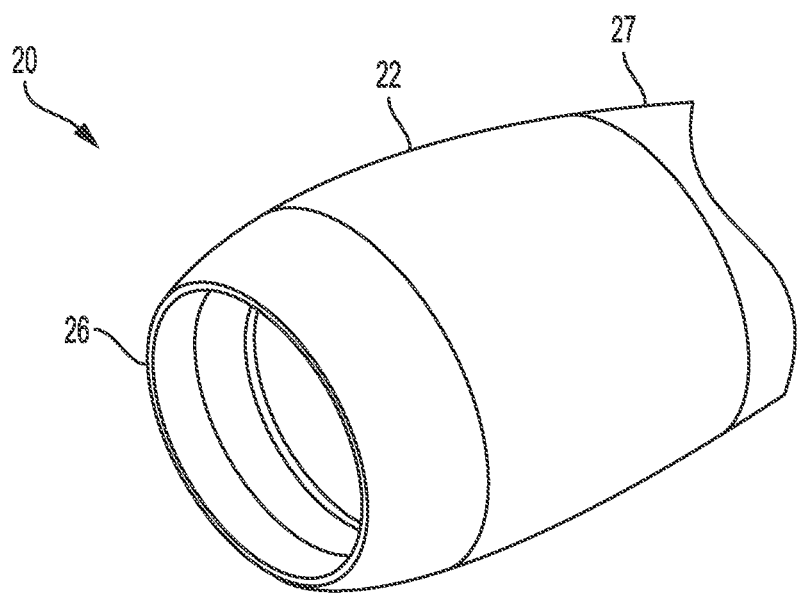
FIG. 2 depicts an illustrative engine nacelle for an aircraft.
Figure 3:
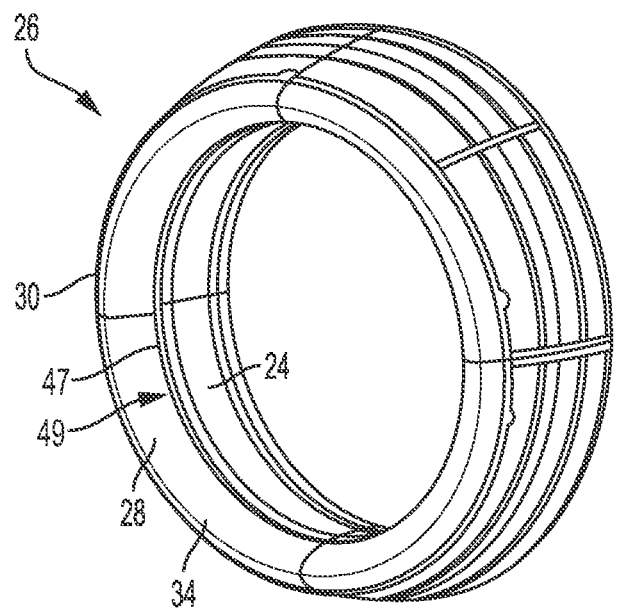
FIG. 3 depicts an air inlet cowl for an engine nacelle.
Figure 4:
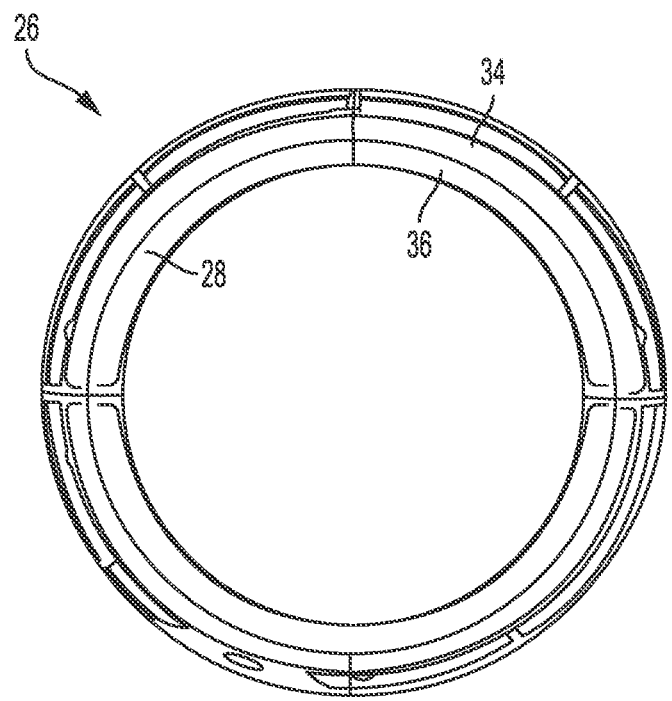
FIG. 4 depicts an air inlet cowl for an engine nacelle showing an illustrative ice protection system applied to the lip skin of the air inlet cowl.

As shown in FIG. 2, an engine nacelle 20 may include a fan cowl 22, an inlet cowl 26, and a thrust reverser 27, where inlet cowl 26 is shown in greater detail in FIG. 3. External flow surfaces of inlet cowl 26 may include an inner barrel 24, lip skin 34, and an outer panel. Lip skin 34 may include flow surfaces such as annular inlet surface 28 with a leading edge 30. As shown in FIG. 4, a metallic substance 36 is disposed on a nonconductive substructure of annular inlet surface 28, wrapping over leading edge 30 of inlet cowl 26 onto the outer surface of the inlet cowl.

Figure 5:
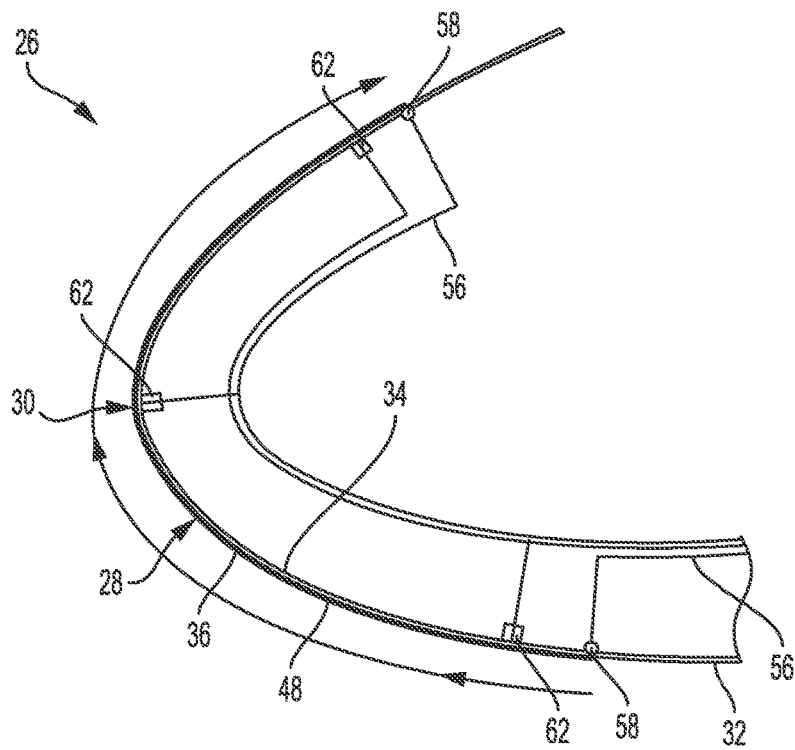
FIG. 5 is a schematic cross-section of an upper portion of a lip skin including an ice protection system according to the present disclosure.

A schematic cross-section of the upper portion of inlet cowl 26 is shown in FIG. 5. A thin layer or thin film 48 of metallic substance 36 is applied to the annular inlet surface 28 of lip skin 34, extending past leading edge 30. Metallic substance 36 may be applied to a nonconductive substructure of inlet cowl 26.

Metallic substance 36 may be any metal or metal alloy of appropriate resistivity that can be applied as a thin layer to the surface of lip skin 34. A metallic substance has an appropriate resistivity when the application of a current across the thin layer of the metallic substance results in the generation of heat by resistive heating. The power required to heat a material to sufficient temperature for anti-ice operation is dependent on mass and specific heat capacity. Accordingly, the metallic substance may have a low density and low specific heat capacity to minimize power requirements. A metallic substance that can be deposited as a thin layer may minimize the mass of the material that that is required to be heated through resistance heating, thus minimizing the power requirement.

A metallic substance with high conductivity requires high current to generate sufficient resistive heating to be useful for anti-icing, while a metallic substance that has high resistivity requires high voltage to generate useful heating. A useful metallic substance may be one that generates useful resistive heating when applied as a layer having a thickness in a range of approximately 0.001 inches to approximately 0.050 inches.

Metallic substance 36 may be applied to the desired nonconductive substrate, for example lip skin 34, by any appropriate mechanism. Metallic thin films may be applied via several different deposition methods, such as evaporative deposition, physical vapor deposition, sputter deposition, and organometallic vapor phase epitaxy (OMVPE), electroplating, or electroforming, among others. Alternatively or in addition, the metallic film may be preformed and then applied to the substrate as a thin film or metallic cloth.

Where the metallic substance is applied as a preformed film or cloth, the metallic film or cloth may be patterned. That is, the film or cloth may include one or more voids, apertures, or discontinuities that may be arranged in a regular repeating pattern. One such patterned film or cloth may include a mesh pattern, for example, or a repeating pattern of apertures, among others.

In examples where metallic substance 36 is applied by electroplating or other electrodeposition, a seed conductor may be included in the ice protection system. That is, a second conductive material may be applied to the nonconductive substrate prior to deposition of metallic substance 36 onto the nonconductive substrate. The second conductive material may be selected to have a different conductivity and/or resistivity to metallic substance 36, such that a current introduced to thin film 48 travels through and thereby heats metallic substance 36 and not the second conductive material.

The metallic substance may be amorphous in structure, or may be nanocrystalline. Nanocrystalline materials are polycrystalline, where the discrete crystal domains of the material (crystallites, or grains) are on the order of nanometers in size. Nanocrystalline materials may have grain sizes below about 100 nm. Some amorphous metals may be converted into nanocrystalline materials by annealing the metal above its crystallization temperature.

The metallic substance may include any suitable metal, or metallic composition, but in one aspect of the disclosed ice protection systems the metallic substance includes at least one of titanium oxide ($TiO_x$), nichrome (NiCr), nickel-iron (NiFe), and nickel-cobalt (NiCo). In some examples, thin layer 48 may include a coating of Invar and/or a mesh of Ti 6Al-4V or 2219-T62.

Referring again to FIG. 5, metallic substance 36 forms a thin external layer. Inlet cowl 26 need not support the additional mechanical apparatus of a conventional anti-icing system, including a forward bulkhead, supply duct, exhaust duct, thermal blankets and support structure. Additionally, lip skin 34 of inlet cowl 26 need not be required to withstand the extremely high temperatures previously applied to the interior of the inlet cowl in order to heat the outer surface through conduction. Elimination of thermal sizing conditions due to such high temperatures may allow inlet cowl 26 to take advantage of composite materials and improved design conditions to reduce weight and streamline nacelle assembly.

For example, lip skin 34 may be composed of composite materials, and formed in a single piece, or large segments, so the external surface of inlet cowl 26 does not require the plurality of joints and fasteners that are currently employed, resulting in a smoother external surface and increased laminar air flow over the lip skin, reducing drag and increasing efficiency. A composite construction of the inlet cowl also permits the extension of an acoustic attenuation area, particularly along inner surface 32 of the inlet cowl, to reduce aircraft noise.

Figure 6:
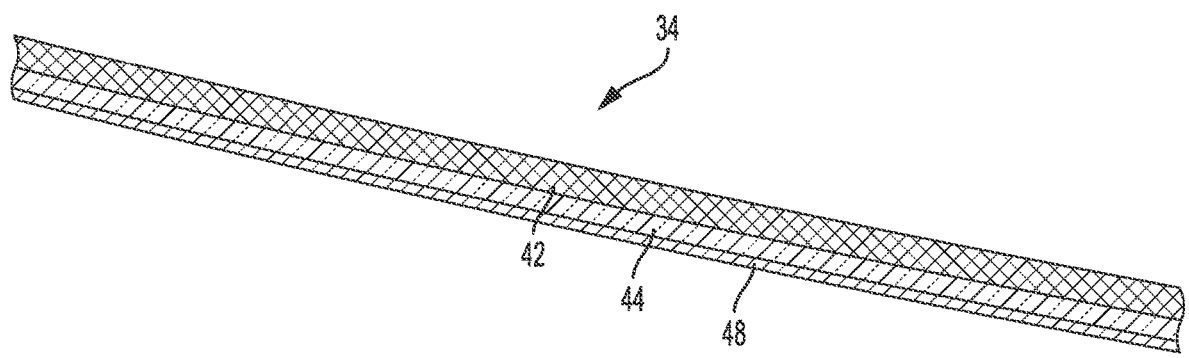
FIG. 6 is a schematic cross-section of a portion of the lip skin of FIG. 5.

In one aspect, the disclosed ice protection system permits lip skin 34 to connect to inner barrel 24 of engine nacelle 20 via an interlocking or overlapping joint 47 that may be attached via an overlapping staggered fastener row 49 (see FIG. 3), or the inner barrel and lip skin of the nacelle may be formed as a single piece.

Where the substrate for the metallic substance includes a composite material, it may be comparatively easy to create a nonconductive substrate for the metallic film. Typically, a nonconductive substructure for the metallic substance may include an isolator substrate and a plurality of structural graphite composite plies. For example, the lip skin 34 of the cross section of FIG. 5 is enlarged in FIG. 6, showing the arrangement of the metallic substance, the isolator, and the underlying structure. As shown, the exemplary lip skin 34 includes an inner skin 42 of structural graphite composite. The composite is covered by an isolator 44, which may include one or more plies of a material such as fiberglass, to provide additional electrical insulation and to provide the thin film 48 of metallic substance 36 with a nonconductive substructure.

Figure 7:
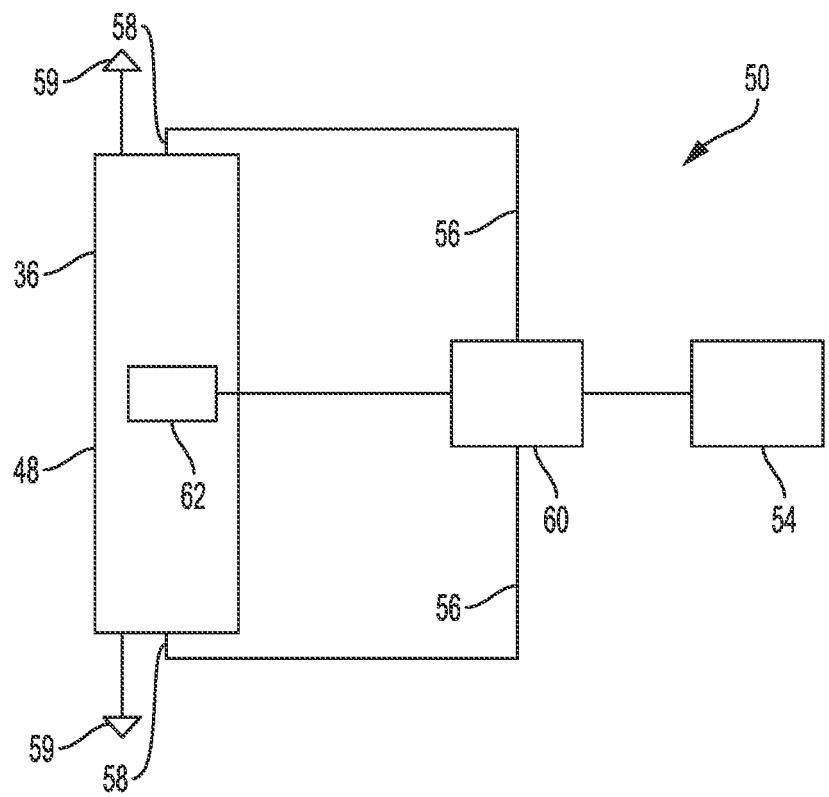
FIG. 7 schematically depicts the illustrative ice protection system of FIG. 5.

FIG. 7 schematically depicts an illustrative ice protection system 50 according to the present disclosure, elements of which are also shown in FIG. 5. Ice protection system 50 includes thin film 48 of metallic substance 36. In some examples, ice protection system 50 may include a thin film of metallic substance that has been appropriately applied to any desired portion of an aircraft.

Ice protection system 50 further includes an electrical power source 54, where the electrical power source includes one or more batteries, one or more electrical generators, or a combination thereof. The power source 54 is electrically connected to thin film 48 by a conductor circuit 56 via a plurality of electrical leads 58. Thin film 48 is also connected to ground through the aircraft current return network (CRN) 59. Power source 54 is connected to thin film 48 in such a way that power source 54 creates a current within and across thin film 48.

In order to employ resistive heating created by passing a current through thin film 48, the electrical leads 58 should be appropriately placed with respect to the geometry of thin film 48. Any current applied across thin film 48 will necessarily follow a path of least resistance, and so the path should be selected to maximize the area of thin film 48 to undergo resistive heating. Electrical leads 58 should be connected to thin film 48 in such a way that the imposed current must travel across either a width or a length of the thin film, so that the thin film is evenly heated. Alternatively, or in addition, the ice protective system may comprise multiple thin films, disposed so as to be adjacent to one another while electrically isolated from one another with separate regulation of current and temperature.

As shown in FIG. 5, electrical leads 58 are attached to thin film 48 at the inner (lower) terminus and the outer (upper) terminus of thin film 48. In some examples, the outer terminus may be grounded to the aircraft current return network (CRN) 59, as shown in FIG. 7. As configured, the direction of current flow leads from the inner terminus to outer terminus, as indicated by an arrow. It should be apparent that it could be impractical to deliver current across an annular thin film covering the entire lip skin of a nacelle using only a single pair of electrical leads. More practically, the annular thin film may be separated into a plurality of arc segments, with each arc segment having its own inner lead and outer lead, or ground.

As shown in FIG. 7, ice protection system 50 further may include a controller 60 that is configured to monitor and regulate a current flow through the metallic substance 36 from the power source 54. Controller 60 may further receive feedback from thin film 48 via the one or more temperature sensors 62 which are configured to measure the temperature of the thin film 48 and provide the temperature data to controller 60. Each segment of thin film 48 may have more than one temperature sensor, and typically each segment would have at least one temperature sensor. Controller 60 may be further electrically coupled to the flight instruments of the aircraft upon which ice protection system 50 is installed, either directly (as a dial or gauge) or indirectly (as a data feed for a digital instrument system).

Controller 60 may provide routine temperature information to the flight crew of the aircraft, so that the potential for, or existence of, icing conditions may be monitored. Controller 60 may also monitor the temperature of thin film 48 in order to provide feedback to regulate the amount of current provided to the thin film. For example, a high initial current may be applied to thin film 48 in order to quickly heat the metallic substance 36 to a temperature above the melting point of water ice under existing conditions. Temperature sensor 62 may provide feedback to controller 60 as to when a desired or setpoint temperature of thin film 48 is reached. For ground operation, temperature sensor 62 may provide input for command system operation coupled with a visual indicator for safe ground operation.

In one aspect of the present disclosure, the ice protection system is configured so that it is capable of heating metallic substance 36 to at least anti-ice/de-ice temperature requirements within the required time limits for safe aircraft operation. For example, the ice protection system may be configured to heat metallic substance 36 by at least 800° Fahrenheit within one minute. For another example, the ice protection system may heat metallic substance 36 by at least 800° Fahrenheit within one minute by using less than 100,000 Watts, or between 100 and 100,000 Watts.

Commercial aircraft typically possess sufficient batteries and/or generators to meet the routine electrical needs of the aircraft. The ice protection systems of the disclosure may be coupled with an existing power network of an airplane that has adequate capacity for such systems. Alternatively, and perhaps advantageously, the ice protection system may include a dedicated power source, such as one or more batteries and/or generators, which may provide the necessary electrical power for the ice protection system. This dedicated power source may be isolated from, or connected with, the existing power network for the aircraft.

Various aspects and examples of ice protection systems and methods of manufacturing ice protection systems, are described below and illustrated in the associated drawings. Unless otherwise specified, an ice protection system and/or its various components may, but are not required to, contain one or more of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples will necessarily provide the same advantages or the same degree of advantages.

Examples, Components, and Alternatives

The following sections describe selected aspects of exemplary ice protection systems and/or methods. The examples in these sections are intended for illustration and should not be interpreted as limiting the entire scope of the present disclosure. Each section may include one or more distinct examples, and/or contextual or related information, function, and/or structure.

Example 1

Figure 8:
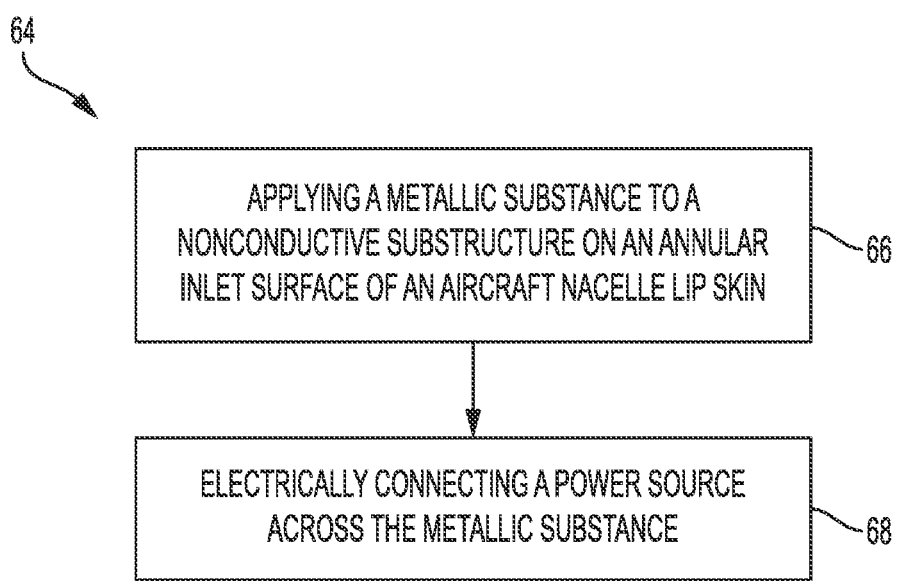
FIG. 8 depicts a flowchart for a method of manufacturing an ice protection system of the present disclosure.

This example describes an illustrative method of preparing an ice protection system, as set out in flowchart 64 of FIG. 8. The disclosed ice protection systems may be prepared by applying a metallic substance to a nonconductive substructure of an aircraft nacelle lip skin, at step 66 of flowchart 64, and electrically connecting a power source across the metallic substance, at step 68 of flowchart 64.

Example 2

This example describes the calculations necessary in order to obtain an idealized estimate of the electrical energy required for a desired heating of a thin metallic film to employ it as an ice protection system. The calculations do not account for all factors, such as heat loss due to convection/conduction and rain impingement.

The calculations are based upon an illustrative ice-protection system that includes a thin film of nanocrystalline nickel-iron (NiFe) applied to the inner lip skin of an inlet cowl for an engine nacelle, the film having a thickness of 0.01 in. Other suitable materials may include titanium oxide ($TiO_x$), nichrome (NiCr), nickel-iron (NiFe), nickel-cobalt (NiCo), invar, Ti 6Al-4V, and/or 2219-T62.

The energy required to heat the thin film of the illustrative ice protection system may be estimated by the specific heat equation:

$$Q_{req} = mc\Delta T$$

where $Q_{req}$ is the heat energy absorbed by the film, $\Delta T$ is the change in temperature of the film, m is the mass of the metallic substance forming the film, and c is the specific heat of the metallic substance employed.

Assuming that the illustrative ice protection system is capable of anti-icing operations, the ice protection system should be capable of heating the thin film from an initial temperature of −30° F. (icing conditions) to a final temperature of 800° F., at which point the accumulated ice would be removed. This corresponds to a temperature increase of 830° F. The surface temperature requirement for anti-icing operation is approximately 300° F., but the temperature 800° F. is used to approximate heat loss.

The specific heat, or value for c for nickel-iron, is known:

$$c_{NiFe} = 0.120 \frac{BTU}{lbs \cdot °F}$$

The mass of the metallic substance forming the thin film may be approximated by considering the geometry of the thin film itself. As shown in FIG. 4, the area to be covered by the metallic thin film forms an annular sheet on the inner lip skin of the air inlet cowl. The area of the thin film may be approximated by multiplying the width (W) of the annular strip (28 in) by the approximate circumference of the strip (L=460 in), yielding an area A=12880 $in^2$. By multiplying that estimated area by the thickness of the film (t=0.01 in), the approximate volume of nickel-iron may be determined to equal 128.8 $in^3$.

Knowing the volume of the thin film, the mass of the metallic substance may be calculated using the density of the metallic substance. The density for the nickel-iron used is known:

$$\rho_{density} = 0.300 \frac{lb}{in^3}$$

giving a total mass of m=38.64 lbs.

Plugging these values into the specific heat equation, we obtain a $Q_{req}$ of 3849 BTUs. That is, 3849 BTUs of heat energy must be applied to the thin film in order to achieve the desired increase in temperature.

By assigning a desired time interval in which the desired heating should occur, the power (P) required can be calculated. By setting the time equal to 45 seconds, we require that the heating of the thin film from −30° F. to 800° F. take only 45 seconds to complete.

$$P_{req} = \frac{Q_{req}}{45 \, sec} = 85.48 \frac{BTU}{sec} = 90228 \, Watts$$

With power known, the required applied voltage can be calculated using the resistivity of the metal film. However, the resistivity of the film will change (increase) as the film heats up. The final resistivity $\rho_f$ can be calculated from initial resistivity ($\rho_i$=2.3622×10$^{-5}$ ohm·inch) as follows:

$$\rho_f = \rho_i(1+\alpha(T_f-T_i)) = 5.1482 \times 10^{-5} \, ohm \cdot in$$

where $\alpha$ is the temperature coefficient of resistance. Knowing the resistivity, the actual resistance (R) of the thin film is determined based upon the configuration of the film:

$$R = \rho_f\left(\frac{L}{A}\right) = 0.0846 \, ohms$$

With both the required power known ($P_{req}$=90228 Watts) and the resistance known (R=0.0846 ohms), the required Voltage can be calculated:

$$V_{req} = \sqrt{P_{req} \times R} = 87.36 \, volts$$

as well as the current required:

$$I_{req} = \frac{P_{req}}{V_{req}} = 1032 \, amperes$$

The electrical demands of the illustrative ice protective system for the air inlet cowl of one engine nacelle would therefore be satisfied by a power source capable of delivering 1032 amps at 87 volts.

Previous studies have shown that employing resistive heating as an anti-icing mechanism is not practical when attempting to heat the entire mass of a portion of an aircraft skin, such as for example the lip skin of the air inlet cowl. Attempting to resistively heat this amount of material requires substantial power. For example, resistive heating of an aluminum lip skin itself that is 28 inches wide, 460 inches long, and 0.08 inches thick would require more than 745 kilovolt amperes to obtain a temperature change of 830 F in 45 seconds. Such a power demand would require additional electrical generator capacity, incurring a weight penalty that may cost even more than currently used heavy and complex hot air-based ice protective systems.

In contrast, resistive heating of a coating demands significantly less power. For example, a 0.01 inch thick NiFe annular coating applied to the lip skin of an air inlet cowl, the film being applied to the same area of 28 inches wide by 460 inches long, would require only approximately 156 kilovolt amperes amperes to obtain a temperature change of 830 F in 45 seconds, a modest demand that can be met with a relatively small generator and/or battery array.

Additionally, the application area of the coating may be optimized for anti-icing effects. For instance, the illustrative 0.01 inch thick NiFe annular coating may be applied to an area that includes the leading edge of the lip skin, but that is only 20 inches wide by 460 inches long. Such a coating would require only approximately 111 kilovolt amperes, further reducing power demand.

Effectively, minimizing the volume of the material that is heated to generate the required heat flux minimizes power requirements. Heating a coating of metallic material as opposed to the full mass of lip skin allows reduction of volume in two separate ways, reduction of thickness and reduction of area. A coating may be as thin as is practical to apply, while the lip skin or other aircraft component may have structural limitations on thickness. Use of a coating also allows heating to be confined to a selected area defined by the placement of the coating. A coating may be applied strategically in only those areas prone to formation of ice, without constraints imposed by the additional functions performed by other components of an aircraft, such as aerodynamic flow shaping. Additionally, the material of the coating may be chosen to be most efficient for resistive heating, while structures such as the lip skin may have limitations on material based on structural or other considerations.

The calculation methods described above may also be used to calculate the power requirement for heating a metallic thin film on the inlet lip skin of an air inlet cowl by a selected number of degrees as a function of heating time. That is, how much power would be required to heat the thin film for a desired temperature increase within various time intervals.

Example 3

This section describes additional aspects and features of the disclosed ice protection systems and methods of manufacture presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. An ice protection system for an aircraft engine, comprising an aircraft nacelle including an inner barrel portion connected to a lip skin portion, the lip skin portion having an annular inlet surface on a nonconductive substructure, a metallic substance disposed on at least a portion of the annular inlet surface, an electrical power source, and a conductor circuit electrically connecting the power source across the metallic substance.

A2. The ice protection system of paragraph A1, wherein the metallic substance is nanocrystalline.

A3. The ice protection system of paragraph A1, wherein the metallic substance includes at least one of $TiO_x$, NiCr, NiFe, and NiCo.

A4. The ice protection system of paragraph A1, wherein the metallic substance forms an outer layer having a thickness in a range of approximately 0.001 inches to approximately 0.050 inches.

A5. The ice protection system of paragraph A1, wherein the power source includes one or more of a battery and a generator.

A6. The ice protection system of paragraph A1, further comprising one or more temperature sensors configured to monitor a temperature of the metallic substance, and a controller configured to regulate the current flow through the metallic substance based on data received from the one or more temperature sensors.

A7. The ice protection system of paragraph A1, wherein the nonconductive substructure is comprised of an isolator of fiberglass.

A8. The ice protection system of paragraph A1, wherein the nonconductive substructure includes a plurality of fiberglass plies and a plurality of graphite plies.

A9. The ice protection system of paragraph A1, wherein the inner barrel portion is connected to the lip skin portion by a joint characterized by an overlapping staggered fastener row.

A10. The ice protection system of paragraph A1, wherein the metallic substance, the power source, and the conductor circuit are capable of heating the metallic substance by at least 800 degrees Fahrenheit in a minute using less than 100,000 Watts.

B1. An ice protection system for an aircraft, comprising: an aircraft external skin portion, the external skin portion having a leading edge surface on a nonconductive substructure, a metallic substance disposed on the leading edge surface, an electrical power source, and a conductor circuit electrically connecting the power source across the metallic substance.

B2. The ice protection system of paragraph B1, wherein the leading edge surface is on an annular portion of a nacelle inlet lip skin.

B3. The ice protection system of paragraph B1, wherein the leading edge surface is a leading edge surface of a wing.

B4. The ice protection system of paragraph B1, wherein the metallic substance is nanocrystalline.

B5. The ice protection system of paragraph B1, further comprising one or more temperature sensors configured to monitor a temperature of the metallic substance, and a controller configured to regulate current flow through the metallic substance based on data received from the one or more temperature sensors.

C1. A method of manufacturing an ice protection system for an aircraft, comprising: applying a metallic substance to a nonconductive substructure on an annular inlet surface of an aircraft nacelle lip skin; and electrically connecting a power source across the metallic substance.

C2. The method of paragraph C1, wherein applying the metallic substance includes electroplating or sputtering the metallic substance onto the annular inlet surface. C3. The method of paragraph C1, wherein applying the metallic substance to the annular inlet surface forms a nanocrystalline coating of the metallic substance.

Advantages, Features, Benefits

The different examples of the methods, apparatus, and systems described herein provide several advantages over known ice protection systems that employ hot air diverted from the aircraft engines to heat aircraft leading edges internally. Illustrative examples of the systems and methods described herein permit rapid and efficient localized heating at the surface of the leading edge of an aircraft. Permitting ice prevention and/or ice removal without requiring the heavy and complex structures, systems and machinery currently needed.

Additionally, by employing the disclosed ice protection systems, the lip skin of an engine air intake cowl could be engineered to employ composite materials, resulting in full depth laminar airflow over the entire circumference of the lip skin. The composite lip skin could additionally eliminate the current need for a plurality of fasteners on lip skin, or the outer mold line of the aircraft, as larger portions of the aircraft skin can made in a single piece. Composite panels may also incorporate integrated stiffeners or honeycomb panels for strength enhancement. In addition, a composite lip skin may incorporate additional acoustic attenuation area on the inner barrel and lip skin of the engine nacelle, reducing engine noise.

Eliminating conventional hot air-based anti-icing systems results in the elimination of hot air ducting and valves, hot air exhaust, and the forward bulkhead, reducing both cost and weight. This improves the maintainability of the aircraft, enhances the ability to repair the ice protective system, and creates an ice protective system that has an enhanced tolerance for damage. Aircraft performance is also improved due to the full depth laminar flow lip skin, elimination of fasteners on the outer mold line (OML) of the lip skin, and elimination of air diversion from the engine for anti-ice operation.

In addition to the above advantages, the disclosed ice protection systems will further enhance aircraft safety, as the systems permit the surfaces of leading edges prone to ice accumulation to be rapidly heated to temperatures to enhance ice removal and prevention.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An ice protection system for an aircraft engine, comprising:
    an aircraft nacelle including an inner barrel portion connected to a lip skin portion, the lip skin portion including a nonconductive substructure providing having an annular inlet surface,
    a metallic substance disposed on at least a portion of the annular inlet surface and forming an external film,
    an electrical power source, and
    a conductor circuit electrically connecting the power source across the metallic substance.

2. The ice protection system of claim 1, wherein the metallic substance is nanocrystalline.

3. The ice protection system of claim 1, wherein the metallic substance includes at least one of $TiO_x$, NiCr, NiFe, and NiCo.

4. The ice protection system of claim 1, wherein the metallic substance forms an outer layer having a thickness in a range of 0.001 inches to 0.050 inches.

5. The ice protection system of claim 1, wherein the power source includes one or more of a battery and a generator.

6. The ice protection system of claim 1, further comprising a temperature sensor configured to monitor a temperature of the metallic substance, and a controller configured to adjust a current flow through the metallic substance based on data received from the temperature sensor.

7. The ice protection system of claim 1, wherein the nonconductive substructure is comprised of fiberglass.

8. The ice protection system of claim 1, wherein the nonconductive substructure includes a plurality of fiberglass plies and a plurality of graphite plies.

9. The ice protection system of claim 1, wherein the inner barrel portion is connected to the lip skin portion by a joint characterized by an overlapping staggered fastener row.

10. The ice protection system of claim 1, wherein the metallic substance, the power source, and the conductor circuit are capable of heating the metallic substance by at least 800 degrees Fahrenheit in a minute using between 100 and 100,000 Watts.

11. A method of manufacturing the ice protection system for an aircraft engine of claim 1, the method comprising:
    depositing the metallic substance on the annular inlet surface of the nonconductive substructure, and
    electrically connecting the electrical power source across the metallic substance.

12. The method of claim 11, wherein depositing the metallic substance includes electroplating or sputtering the metallic substance onto the annular inlet surface.

13. The method of claim 11, wherein depositing the metallic substance on the annular inlet surface forms a nanocrystalline coating on the annular inlet surface.

14. The method of claim 11, wherein the power source is a power system of the aircraft.

15. The method of claim 11, wherein depositing the metallic substance includes depositing a layer having a thickness in a range of 0.001 inches to 0.050 inches.

16. An ice protection system for an aircraft, comprising:
    an aircraft skin portion, the skin portion including a nonconductive substructure providing a leading edge surface,
    a metallic sheet located on the leading edge surface and forming an exterior surface region of the aircraft,
    an electrical power source, and
    a conductor circuit electrically connecting the power source across the metallic sheet.

17. The ice protection system of claim 16, wherein the leading edge surface is on an annular portion of a nacelle inlet lip skin.

18. The ice protection system of claim 16, wherein the leading edge surface is a leading edge surface of a wing.

19. The ice protection system of claim 16, wherein the metallic sheet includes a metallic substance that is nanocrystalline.

20. The ice protection system of claim 16, further comprising a temperature sensor configured to monitor a temperature of the metallic sheet, and a controller configured to adjust current flow through the metallic sheet based on data received from the temperature sensor.

* * * * *